UNITED STATES PATENT OFFICE.

HERMANN VIERTEL, OF CHARLOTTENBURG, AND GEORG EGLY, OF LICHTENBERG, NEAR BERLIN, GERMANY, ASSIGNORS TO GEBRÜDER SIEMENS & COMPAGNIE, OF CHARLOTTENBURG, NEAR BERLIN, GERMANY.

METHOD OF MAKING ELECTRICALLY-CONDUCTING BODIES FOR USE AS CONTACTS.

No. 842,730.  Specification of Letters Patent.  Patented Jan. 29, 1907.

Application filed September 22, 1906. Serial No. 335,832.

*To all whom it may concern:*

Be it known that we, HERMANN VIERTEL, engineer, of Charlottenburg, Berlin, Germany, and GEORG EGLY, chemist, of Lichtenberg, near Berlin, Germany, have jointly invented a certain new and useful Improved Method of Making Electrically-Conducting Bodies for Use as Contacts, and do hereby declare that the following is a full, clear, and exact description of the same.

The present invention relates to a method of manufacturing electrically-conducting bodies for use as sliding and pressure contacts, said bodies consisting of metallic alloys and carbon, consisting in the bodies being made by mixing metallic powders and carbon and subsequently pressing and molding in mixture and heating them in an indifferent or reducing atmosphere until softening and alloyage take place.

The manufacture of molded electrically-conducting bodies from mixtures of metal and carbon by mixing the mixtures with an agglutinant—for example, tar—and then pressing them, embedding the same in powdered carbon, and burning them, is in itself known. The cohesion of the particles of metal and carbon is effected in these bodies by means of the tar-coke, which remains behind after the vaporization of the tar; but such electrically-conducting bodies when employed as sliding or pressure contacts do not always meet the demands placed on them with respect to durability, hardness, and electrical conductivity. It has, moreover, been attempted to obtain greater conductivity and durability and the desired degree of hardness by copper-plating the particles of carbon in the first place and then tin-plating them and molding the material thus prepared with so much trouble by means of pressure and under heat; but a simple and certain method is also not obtained in this manner. It is also not new to burn resistance bodies which consist of carbonaceous commixtures in a reducing or in different atmosphere.

Now in accordance with the present invention the manufacture of electrically-conducting bodies which meet all the requirements placed on them, particularly when used as dynamo-brushes and the like, is effected in a simple manner and with constant perfect uniformity by the metals of which the concerned metallic alloy consists being employed in powdered form. The different metallic powders—for example, copper and zinc or copper and tin or copper, zinc, and tin—and the like other mixtures are mixed intimately with carbon without preparation, molded, and heated to about 600° centigrade in an indifferent or preferably in a reducing atmosphere—for example, in an hydrogenous atmosphere—whereby the separate metallic powders become alloyed with one another and form an exceedingly uniform mass with a metallic appearance with the inclosed carbonaceous material.

A mixture particularly suitable for dynamo-brushes consists, for example, of seventy-five parts of copper, twenty parts of tin, and five parts of zinc. This mixture of metals has added to it, according to the desired conductivity and hardness, more or less graphite—for example, ten per cent. of graphite—and the mixture is thoroughly kneaded with water or other agglutinant, pressed in molds, and then heated in an hydrogenous atmosphere until softening and alloyage of the metallic powders take place. The conductivity of such bodies can be still more increased if they are subjected again to pressure after the metallic coalescence has taken place.

What we do claim as our invention, and desire to secure by Letters Patent, is—

1. A method of making electrically-conducting bodies for use as contacts consisting in intimately mixing together metallic powders and carbon, pressing and molding the mixture, and heating the same until softening and alloyage take place.

2. A method of making electrically-conducting bodies for use as contacts consisting in intimately mixing together metallic powders and carbon, adding thereto and mixing therewith an agglutinant, pressing and molding the mixture, and heating the same until softening and alloyage take place.

3. A method of making electrically-conducting bodies for use as contacts consisting in intimately mixing together metallic powders and carbon, adding thereto and mixing therewith an agglutinant, pressing and molding the mixture, and heating, the same in a reducing atmosphere until softening and alloyage take place.

4. A method of making electrically-conducting bodies for use as contacts consisting in intimately mixing together copper, tin and zinc in the form of powder, adding thereto and mixing therewith water, pressing and molding the mixture, and heating the same in an hydrogenous atmosphere until softening and alloyage take place, substantially as herein described.

In witness whereof we have hereunto set our names, this 7th day of September, 1906, in presence of two subscribing witnesses.

HERMANN VIERTEL.
GEORG EGLY.

Witnesses:
HENRY HASPER,
WOLDEMAR HAUPT.